United States Patent
Nemser et al.

(10) Patent No.: US 9,079,138 B2
(45) Date of Patent: Jul. 14, 2015

(54) ORGANIC FLUID PERMEATION THROUGH FLUOROPOLYMER MEMBRANES

(75) Inventors: Stuart M. Nemser, Wilmington, DE (US); Praveen Kosaraju, New Castle, DE (US); John Bowser, Newark, DE (US)

(73) Assignee: CMS Technologies Holdings, Inc., Newport, DE (US)

(*) Notice: Subject to any disclaimer, the term of this patent is extended or adjusted under 35 U.S.C. 154(b) by 800 days.

(21) Appl. No.: 13/279,904

(22) Filed: Oct. 24, 2011

(65) Prior Publication Data

US 2012/0097612 A1   Apr. 26, 2012

Related U.S. Application Data

(60) Provisional application No. 61/406,361, filed on Oct. 25, 2010.

(51) Int. Cl.

| | |
|---|---|
| *B01D 39/00* | (2006.01) |
| *B01D 39/14* | (2006.01) |
| *B29C 39/00* | (2006.01) |
| *B01D 29/46* | (2006.01) |
| *B01D 71/32* | (2006.01) |
| *B01D 61/02* | (2006.01) |
| *B01D 67/00* | (2006.01) |
| *B01D 71/36* | (2006.01) |

(52) U.S. Cl.
CPC .............. *B01D 71/32* (2013.01); *B01D 61/027* (2013.01); *B01D 67/0013* (2013.01); *B01D 67/0088* (2013.01); *B01D 71/36* (2013.01); *B01D 2325/027* (2013.01)

(58) Field of Classification Search
CPC ........ B01D 69/12; B01D 71/32; B01D 69/02; B01D 69/122; B01D 67/0002; B01D 67/0011; B01D 71/36
USPC ............ 210/500.27, 490, 500.36, 640; 95/45, 95/52–54; 264/45.1; 585/818
See application file for complete search history.

(56) References Cited

U.S. PATENT DOCUMENTS

| | | | |
|---|---|---|---|
| 3,499,062 A | 3/1970 | Geary, Jr. et al. | |
| 3,536,611 A | 10/1970 | De Felippi et al. | |
| 4,230,463 A | 10/1980 | Henis et al. | |
| 5,565,166 A | 10/1996 | Witzko et al. | |
| 5,876,604 A | 3/1999 | Nemser et al. | |
| 5,914,154 A * | 6/1999 | Nemser .................. | 427/245 |
| 6,406,517 B1 * | 6/2002 | Avery et al. ................. | 95/45 |
| 6,478,852 B1 * | 11/2002 | Callaghan et al. ............. | 95/54 |
| 6,517,725 B2 | 2/2003 | Spearman et al. | |
| 2005/0238813 A1 * | 10/2005 | Sanguineti et al. ........ | 427/430.1 |
| 2007/0142582 A1 * | 6/2007 | Apostolo et al. .............. | 526/247 |
| 2011/0266220 A1 * | 11/2011 | Campos et al. ............... | 210/640 |
| 2012/0097612 A1 * | 4/2012 | Nemser et al. ................ | 210/654 |
| 2014/0116944 A1 * | 5/2014 | Hu et al. ........................ | 210/650 |

OTHER PUBLICATIONS

Volkov, et al., High permeable PTMSP/PAN composite membranes for solvent nanofiltration, Journal of Membrane Science 333 (2009) pp. 88-93.
Teflon AF Technical Information: Properties of Amorphous Fluoropolymers Based on 2,2-Bistrifluoromethyl-4,5-Difluoro-1,3-Dioxole, Buck, W.H. et al., 183rd Meeting of Electrochemical Society, May 17, 1993, 12pp.
Polyakov, A.M. et al., Amorphous Teflons AF as organophilic pervaporation materials: Transport of individual components, Journal of Membrane Science, 216, Issues 1-2, May 1, 2003, pp. 241-256.
Ywu-Jang Fu et al., Effects of residual solvent on gas separation properties of polyimide membranes, Separation and Purification Technology 62 (2008) 175-182.
Hong Zhao et al., Transport of Organic Solutes through Amorphous Teflon AF Films, J. Am. Chem. Soc. 2005, 127, pp. 15112-15119.

* cited by examiner

*Primary Examiner* — Ana Fortuna
(74) *Attorney, Agent, or Firm* — Jeffrey C. Lew

(57) ABSTRACT

Separation of the components of liquid mixtures is achieved by contacting a liquid mixture with a nonporous membrane having a fluoropolymer selectively permeable layer and imposing a pressure gradient across the membrane from feed side to permeate side. Unusually high transmembrane flux is obtained when the membrane is subjected to one or more process conditions prior to separation. These include (a) leaving some residual amount of membrane casting solvent in the membrane, and (b) contacting the membrane with a component of the mixture to be separated for a duration effective to saturate the membrane with the component.

12 Claims, No Drawings

ORGANIC FLUID PERMEATION THROUGH FLUOROPOLYMER MEMBRANES

This application claims the benefit of U.S Provisional Application No. 61406361 filed Oct. 25, 2010.

Support was provided under Department of Energy award DE-SC0003561. The U.S. government has rights in this patent application.

FIELD OF THE INVENTION

This invention relates to the membrane separation of components from organic chemical liquid mixtures using selectively permeable polymeric membranes having perfluorinated monomer repeating units.

BACKGROUND OF THE INVENTION

It is often desirable to separate one or more desired compounds from a liquid mixture containing the desired compounds and other components. The other components may be similar in chemical nature to the desired compounds which makes separation by conventional methods difficult, energy intensive or financially costly. For example, the separation of a light hydrocarbon compound, such as hexane from a liquid mixture of heavy hydrocarbons in a petroleum refining process can require complex and high energy consuming distillation. In other cases, the desired compound can be a component of a mixture that forms an azeotrope with the other components. In that case, many conventional separating techniques to obtain the desired compound can be futile.

When a suitable combination of desired compound, liquid mixture and selectively permeable membrane can be identified, the desired compound can be removed from the liquid mixture by selectively permeating the mixture through the membrane. The desired compound or compounds can permeate either faster or slower than other mixture components to achieve the intended separation. Of interest is a membrane separation process known as organic solvent nanofiltration or solvent resistant nanofiltration (hereinafter collectively referred to as "nanofiltration"). See for example, Volkov, et al., *High permeable PTMSP/PAN composite membranes for solvent nanofiltration, Journal of Membrane Science* 333 (2009) pp. 88-93. Characteristic features of nanofiltration are that the feed and permeate fluids in contact with the membrane are present in the liquid state and that the driving force for permeation is hydraulic pressure gradient from feed to permeate sides.

In membrane separations the membrane composition should be substantially unaffected by the liquids being separated. This can be problematic for nanofiltration processes applied to separating liquid mixtures of or containing organic solvents such as hydrocarbons. Such solvents can react with and/or solubilize the membrane under preferred conventional nanofiltration conditions. Hence it is desired to have a composition that can be formed into a membrane, that is selectively permeable to the liquid components being separated and that is not affected by contact with those components.

Composite membranes are commonly used for nanofiltration. One of the traditional methods of making composite membranes calls for dissolving a polymeric composition for the membrane in a suitable solvent and casting the resulting solution on a support. The support wet with casting solution normally is thoroughly dried to remove substantially all of the solvent. Typically solvent is removed by heating the wet membrane to a high temperature to speed up volatilization of the solvent. Drying temperatures are limited by the phase transition temperature of the polymeric compositions. If the temperature is too high, the membrane can soften, deform and even break. Separation membranes are vulnerable to such distortion because they are usually made to extremely small thicknesses to improve transmembrane flux.

It is desirable to have a membrane for a nanofiltration process that provides a high flux of the permeating liquid component It is also desirable that the membrane is inert to a wide variety of organic solvents so that it can be used to separate mixtures of organic liquids.

SUMMARY OF THE INVENTION

Separation of the components of liquid mixtures is achieved by contacting the liquid mixture with a nonporous membrane having a fluoropolymer selectively permeable layer and imposing a pressure gradient across the membrane from feed side to permeate side. Unusually high transmembrane flux is obtained when the membrane is subjected to one or more process conditions prior to separation. These include (a) leaving some residual amount of membrane casting solvent in the membrane, and (b), contacting the membrane with a component of the mixture to be separated for a duration effective to saturate the membrane with the component.

Accordingly there is provided a selectively permeable membrane formed by the process comprising the steps of: (A) providing a polymeric composition comprising repeating units of a polymerized perfluorinated monomer, (B) dissolving the polymeric composition in a liquid medium, thereby forming a membrane casting solution, (C) depositing the casting solution onto a support structure to form thereon a membrane precursor saturated with a residual amount of the liquid medium within the membrane precursor, (D) optionally draining free-flowing membrane casting solution from the membrane precursor, and (E) removing from the membrane precursor a fraction of the equilibrium amount of the liquid medium effective to produce a nonporous selectively permeable membrane.

There is further provided a method of separating a desired liquid compound from a liquid feed comprising the steps of (A) providing a polymeric composition comprising repeating units of a polymerized perfluorinated monomer, (B) dissolving the polymeric composition in a liquid medium, thereby forming a membrane casting solution, (C) depositing the casting solution onto a support structure to form thereon a membrane precursor saturated with a residual amount of the liquid medium within the membrane precursor, (D) optionally draining free-flowing membrane casting solution the membrane precursor, and (E) removing from the membrane precursor a fraction of the residual amount of the liquid medium effective to produce a nonporous selectively permeable membrane, (F) contacting a feed side of the nonporous selectively permeable membrane with the liquid feed while maintaining the liquid feed at a temperature of at most about 400° C., (G) providing a pressure gradient of about 345 kPa-10.3 MPa (50-1500 psi) such that the liquid feed selectively permeates through the nonporous selectively permeable membrane from the feed side to a permeate side of the nonporous selectively permeable membrane opposite the feed side.

There is also provided a method of making a selectively permeable membrane having a preselected permeance comprising the steps of (A) providing a solution of a polymeric composition comprising repeating units of a polymerized perfluorinated monomer dissolved in a solvent, (B) casting the solution onto a substrate to form a membrane precursor of the polymeric composition containing a saturated amount of solvent, (C) identifying a liquid component to be separated from a specified liquid mixture of components by pressure filtration through a selectively permeable membrane of the polymeric composition, (D) determining a range of permeances for the liquid component that corresponds to permeation of the liquid through a series of selectively permeable membranes formed by removing various fractions of the saturated amount of solvent from the membrane precursor, and (E) removing a fraction of the saturated amount of solvent from the membrane precursor such that the resulting selectively permeable membrane will have a preselected permeance for the liquid within the range.

DETAILED DESCRIPTION OF THE INVENTION

As used herein, the following terms have the indicated meanings. "Polymeric composition" means the polymer that forms the active layer of the selectively permeable membrane. "Liquid medium" means a pure component or mixtures of components in the liquid state that serves as a solvent for the polymeric composition. "Casting solution" means a liquid solution of polymeric composition dissolved in the liquid medium. The liquid medium can optionally include dissolved and/or particulate compounds other than the polymeric composition and solvent therefor. "Support structure" means a substrate providing physical support for the active layer of the membrane. The support structure can be a substrate to temporarily receive the active layer that is removed from an intrinsically structurally strong active layer of a monolithic membrane or it can be a porous substrate that remains adjacent the active layer for composite membrane types. "Membrane precursor" means an membrane at an intermediate stage of fabrication in which the polymeric composition is in membrane shape and is wet with liquid medium.

The invention is directed to separations of one or more desired liquid components of a liquid feed using a membrane. The desired component to be separated is in the liquid state. The liquid feed includes the desired component and is totally or predominantly in the liquid state. That is, the liquid feed can contain entrained particulate matter. The liquid feed contacts one side of the membrane and permeation is motivated by creating a hydraulic pressure gradient across the membrane. Faster permeating components are enriched on the permeate side and are depleted in a retentate composition on the feed side of the membrane. Thus a desired component is separated from the feed by concentrating in either the permeate or retentate of the membrane depending upon its speed of permeation relative to the other components.

The polymeric composition of the selectively permeable membrane according to this invention comprises a fluoropolymer. Preferably, the fluoropolymer is perfluorinated polymer or copolymer. This copolymer comprises copolymerized perfluorinated cyclic or cyclizable monomer. It can optionally include another fluorinated comonomer. The other fluorinated comonomer is preferably selected from the group consisting of tetrafluoroethylene ("TFE"), chlorotrifluoroethylene, vinyl fluoride, vinylidene fluoride and trifluoroethylene. A cyclizable monomer is an acyclic diene compound which can undergo ring formation during the polymerization process in which the copolymer according to this invention is formed. Preferably the perfluorinated cyclic or cyclizable monomer is selected from among perfluoro-2,2-dimethyl-1,3-dioxole ("PDD"), perfluoro-2-methylene-4-methyl-1,3,dioxolane ("PMD"), 2,2,4-trifluoro-5-trifluoromethoxy-1,3-dioxole ("TTD") and perfluoro(4-vinyloxyl-1-butene) "PVOB". Great preference is given to the membrane composition of a perfluoro-2,2-dimethyl-1,3-dioxole ("PDD")/tetrafluoroethylene copolymer (Teflon® AF 2400, E. I. du Pont de Nemours & Co.).

Amorphous copolymers of PDD and TFE are selectively permeable to a variety of chemicals and are suitable for forming into membranes. The membrane according to the present invention preferably is a composite membrane structure having a relatively thin, nonporous layer of PDD/TFE copolymer and an adjacent porous support layer. The active selectively permeable component of the membrane for use in this invention is present as a preferably nonporous polymeric film. The film can be a monolithic self-supporting structure, however usually it constitutes a layer of a multilayer composite structure in which the nonporous, selectively permeable layer is supported by a porous substrate.

The physical membrane structure can be any of the well known configurations, such as flat sheet, hollow fiber, tubular, spiral wound and vortex devices (also known as "rotating" devices). Other useful configurations include pleated sheet and tube ribbon form. Membrane tubes and tube ribbons are disclosed in U.S. Pat. No. 5,565,166. Any porous substrate material offering support effective to maintain integrity of the active layer is suitable provided that the substrate is not degraded by the components and does not impede the transmission of the permeable component through the nonporous membrane. Representative examples of porous substrate material are polymers selected from the group consisting of polyacrylonitrile ("PAN"), polyether ether ketone ("PEEK"), polyvinylidene fluoride ("PVDF"), polytetrafluoroethylene ("PTFE"), polyethersulfone ("PES") and polysulfone ("PSF").

Preferably the membrane structure takes the form of a flat sheet or hollow fiber membrane having a porous hollow fiber substrate material which bears a thin coating of the active layer on the surface of at least one side of the substrate. Typically, a plurality of hollow fiber membranes are bundled as a unit together within a single case such that the feed, permeate and retentate for all fibers in the unit flow through common feed, permeate and retentate stream ports, respectively. Such units are sometimes referred to as "modules". Hollow fiber membranes and modules comprising hollow fiber membranes are well known as disclosed by U.S. Pat. Nos. 3,499,062 and 3,536,611, for example.

The selectively permeable membranes according to this invention have surprisingly highly selective permeability to organic compounds such as saturated and unsaturated aliphatic and aromatic hydrocarbon molecules. This permeability occurs under nanofiltration type operating conditions. That is, with high pressure differential across the membrane with both liquid feed and permeate compositions in contact with the opposite sides of the membrane. Fortuitously, the novel membrane compositions are highly inert to hydrocarbons and thus are very structurally stable in nanofiltration of hydrocarbon liquids.

The successful use of amorphous fluoropolymer membranes in nanofiltration of liquid organic chemical mixtures is considered remarkable, particularly in view that the fluoropolymer active layer for separation is preferably nonporous. Common organic liquids have extremely low solubility in fluoropolymers. Therefore, fluoropolymers have very low absorption of most organic compounds in the vapor phase. Consequently, amorphous fluoropolymer membranes had been deemed unattractive for liquid phase permeation of organic compounds in a nanofiltration process. Moreover, the application of fluoropolymer membranes to separation of organic liquids by nanofiltration has not been studied. This invention takes advantage of the unique combination of unexpectedly good selective permeation properties of organic liquids through fluoropolymer membranes and the extreme stability of fluoropolymers in extended contact with many organic liquid mixtures. Consequently, nonporous fluoropolymer membranes of this invention are uniquely able to separate selected individual or mixed components from hydrocarbon mixtures with great selectivity.

The active layer of the novel membrane is identified as preferably being nonporous. By nonporous is meant that the membrane is at least substantially free of microporous pinholes through the active layer. These pinhole features are sometimes referred to as "defects" in an otherwise perfectly nonporous membrane structure, in the sense described by Henis et al. in U.S. Pat. No. 4,230,463. It is not critical that the active layer is absolutely free of defects. A nonporous membrane that is substantially free of defects as described by Spearman in U.S. Pat. No. 6,517,725 is suitable. Despite the high degree of nonporous nature the fluoropolymer membrane is able using hydraulic pressure gradient to permeate selected hydrocarbon components from liquid mixtures of hydrocarbons with great selectivity at significantly high transmembrane flux.

In addition to the fact that the novel membranes have favorable permeability to hydrocarbons, it has been discovered that the permeability can be enhanced when the membranes are modified prior to placing in nanofiltration service. In one aspect, the active layer of the membrane is produced by depositing a casting solution of the fluorinated polymer onto a support. The casting solution can be applied by conventional techniques such as dip, roller, spray, paint or doctor blade coating methods, to name a few examples. This forms the membrane shape, for example as a film. The casting solution contains the fluorinated polymer dissolved in a liquid medium of a suitable solvent for the fluorinated polymer. In conventional membrane formation procedures, the excess solvent is substantially completely and typically, as rapidly as possible removed from the polymeric membrane. However, according to this invention, only a fraction of the casting solution is removed and a significant residual amount of solvent of the liquid medium is left in the fluorinated polymer membrane. In this aspect, the casting solution solvent can be viewed as acting like a plasticizer for the fluorinated polymer.

The membrane structure can be formed while leaving an effective amount of the liquid medium in the fluorinated polymer by subjecting the solvent-cast membrane precursor to mild solvent removal conditions. That is, the membrane precursor is kept at relatively low temperatures and solvent-volatilizing atmospheric conditions for a duration less than would otherwise cause substantially all of the liquid medium to evaporate from the membrane. For example, after casting the membrane from solution at about ambient temperature, the free-flowing membrane casting solution applied by dip coating is drained from the membrane precursor. Draining occurs by gravity flow at a temperature of at most about 35° C. and at ambient atmospheric pressure. Draining may not be called for when a coating technique is used that does not cause deposition of excess liquid medium onto the support, such as spray coating. A sweep of inert gas or mild vacuum (i.e., less than about 5 cm Hg gauge pressure) can optionally be used to withdraw the fumes from the draining solvent liquid. When the membrane precursor is thus in a "drip-dry" condition, such that no liquid solvent is visually evident on the surface, additional liquid medium is removed by subjecting the membrane to a stronger vacuum and/or heat for a duration effective to remove more of the solvent.

The operating conditions of time, temperature and pressure for this additional solvent removal will depend on the particular combination of compositions and membrane shape and size. Appreciating that higher temperatures, longer drying times and lower pressures (i.e., stronger vacuums) each produce more volatility and greater removal of residual liquid medium, one of ordinary skill in the art will be able to select appropriate conditions to achieve desired results without undue experimentation. These drying conditions should be applied such that the concentration of liquid medium remaining in the fluorinated polymer membrane is at most about 15 wt. % of the dried membrane.

The solvent for the casting solution can be one or more individual components of a liquid medium. As used herein, the terms "solvent" and "liquid medium" as applied to the casting solution are referenced interchangeably.

As mentioned, it was discovered that moderately drying the membrane prior to engaging in nanofiltration provides higher flux of a migrating compound during nanofiltration. That is, during the membrane separation process the migrating compound transfers through the membrane faster than when the membrane is prepared from its precursor by thorough removal of substantially all of residual casting solution solvent. A related novel phenomenon is that the flux of the migrating component decreases in relation to the severity of the drying conditions. For example, as the temperature of drying the membrane precursor increases and other conditions being equal, the migrating component flux decreases.

Without wishing to be bound by a particular theory, it is thought that lower drying temperature causes less removal of liquid medium from the precursor and more residual liquid medium in the active layer of the membrane at start of membrane separation. The residual liquid medium thus modifies the membrane and the rate of transfer of the migrating component. When the membrane precursor is dried substantially completely of residual liquid medium, the resulting membrane attains a basic state such that the desired migrating component will permeate at a lowest rate. When drying conditions of the precursor are moderate according to this invention, the structure of the resulting membrane is modified such that the desired migrating component permeates at a faster rate. The degree of membrane modification can be affected by imposing moderate precursor drying conditions. Consequently, transfer of the migrating component can be selectively tuned to rates faster than the lowest rates of the basic state membrane. Other variables than precursor drying temperature can be used to attenuate the extent of liquid medium removal from the precursor or similarly modify the membrane structure. For example, duration of drying, applying a sweep of an inert gas over the drying precursor, drawing off the excess liquid medium under vacuum, chemical nature of the liquid medium, incorporating plasticizing agent(s) into the liquid medium or combinations of these can be utilized. Therefore, preferably nonporous membrane comprising fluoropolymer can be variably modified to achieve a selectively tuned permeance of the migrating compound by controlling the conditions of membrane formation.

From the foregoing it is apparent that the present invention beneficially provides a nanofiltration operator the opportunity and flexibility to design within limits a membrane having a preselected permeance for a liquid component to be separated from a liquid mixture of components. It has been discovered that the permeance of a membrane composition for a liquid component under nanofiltration conditions depends to a degree on the amount of residual solvent when the membrane is cast from solvent solution and the solvent is evaporated. More specifically, when a membrane precursor is cast and substantially all of the residual solvent is removed, the finished (conventional) membrane will have a base line permeance for the liquid component. As the fraction of residual solvent allowed to remain in the finished (novel) membrane increases, the permeance for the liquid component of the corresponding membrane also increases. Hence when contemplating a separation of a liquid component from a mixture by nanofiltration with a fluoropolymer membrane, it is now possible to identify the range of permeances for a series of membranes having different fractions of the saturated amount of casting solvent removed from the membrane precursors. The nanofiltration operator can then form a membrane by choosing a fraction of the solvent to remove in order to obtain a preselected permeance within the range of available permeances.

In another aspect, the modification of the membrane is effected by post-formation treatment of the membrane with one or more of the migrating components of the mixture to be separated. The term "post-formation treatment" refers to the procedure of contacting a completed membrane otherwise ready for being placed in separation service with a treatment substance. In a preferred aspect, post-formation treatment involves contacting the membrane with the one or more migrating components at approximately ambient temperature and pressure for a duration effective to cause such component(s) to saturate the membrane. Thus for example, if the fluorinated polymeric membrane is intended to preferentially separate hexane from a liquid feed of 6-30 carbon containing ($C_6$-$C_{30}$) alkanes, then the active layer of the membrane is soaked with either hexane or liquid mixture of 6-30 carbons containing hexane prior to applying a hydraulic pressure gradient across the membrane to initiate the separation process. Care should be taken to avoid contacting the permeate side of the composite membrane with the feed mixture. Preferably post-formation treatment involves saturating the active layer of the membrane with the preferentially permeating liquid component of the feed. Typically, treatment is achieved by contacting the active layer of the membrane with the liquid feed component for a duration effective for the component to saturate the actively permeating layer of membrane. Post-formation treatment contact with the liquid feed component should be about 1-96 hours and preferably about 1-24 hours.

The present invention is preferred for use in separating desired mixtures of hydrocarbons and substituted hydrocarbons. Examples of desired migrating compounds that can be separated from mixtures are: hydrocarbons, such as hexane, and functional hydrocarbons, such as toluene, ethanol, trichloromethane.

Representative solvents for the polymeric composition and suitable for use in the novel process include perfluoroalkanes, such as perfluorohexane, perfluoroheptane and perfluorooctane, available from 3M Company, Minneapolis, Minn. under the tradenames PF5060, PF5070 and PF5080, respectively. Other representative solvent materials include Fluorinert™ FC-75 and FC 770 Electronic Liquids, and Novec™ HFE-7100 and Novec™ 7300 Engineered Fluids also from 3M. Fluorinert FC-75 is a solvent of perfluorinated compounds primarily with 8 carbons, believed to include 2-butyltetrahydrofuran. Fluorinert FC770 contains C1-C3 perfluorinatedN-alkyl morpholines among other perfluorinated compounds. Novec HFE-7100 includes methyl nonafluoroisobutyl ether and methyl nonafluorobutyl ether. Novec 7300 contains 1,1,1,2,2,3,4,5,5,5-decafluoro-3-methoxy-4-(trifluoromethyl)-pentane.

EXAMPLES

Comparative Example 1

Forming an Effectively Solvent Free Membrane

A 0.3 wt % solution of 87 mole % perfluoro-2, 2-dimethyl-1, 3-dioxole ("PDD")/13 mole % tetrafluoroethylene ("TFE") copolymer (Teflon® AF 2400, E. I. du Pont de Nemours & Co.) copolymer in FC-770 Electronic Liquid fluorinated solvent (3M, Minnesota, USA) was prepared. A thin, 22.9 cm×12.7 cm (9 inch×5 inch) sheet of polyacrylonitrile ("PAN") was dipped into the Teflon AF 2400 solution such that one side of the support was thoroughly wet with solution. The PAN material is further characterized by water flux of 10 kL/m2-hr-MPa and 80% rejection of 20 kDa polyethylene glycol. The wet sheet was removed from contact with the polymer solution and excess solution was drained by gravity. The membrane was kept at room temperature and pressure for a few minutes such that a small amount of solvent evaporated. The evaporation of solvent from a membrane structure is occasionally referred to herein as "drying". A 47 mm circular sample disc was cut from the sheet of the composite Teflon AF 2400 membrane and the sample disc was placed in a high pressure filter holder (Cat. No. XX4505700, Millipore Corporation, Billerica, Mass., US). The gas permeation cell with sample disc of precursor composite membrane was then placed in a ventilated oven heated to 75° C. to cause further evaporation of residual solvent.

After 2 hours in the oven oxygen gas permeance through the membrane was measured. The heating of the sheet in the oven was continued for 18 additional hours (that is, for total of 20 hours of heat treatment). Then another sample disc was cut and oxygen permeance was measured. The heating and gas permeance analyses were continued for 126 hours. Permeance and drying time data are shown in Table 1.

As evaporation time at 75° C. increased, permeance increased until reaching a steady state value at about 102 hours. It was thus concluded that the active, nonporous layer of Teflon AF 2400 copolymer was effectively completely free of solvent at 102 hours of drying at 75° C. (Comparative Example 1). When carrying out the present invention, this technique of evaporating residual solvent for increasing times at constant temperature until reaching steady state gas permeance can be used to determine the state of effective dryness for other polymer-solvent combinations.

Example 2

Preparing a Membrane Having Residual Solvent

The procedure of Comparative Example 1 was repeated except that instead of letting the solution wet membrane precursor stand for only a few minutes at room temperature and pressure, the sheet was maintained at ambient conditions for one week (168 hours). The oxygen gas permeance was measured on a sample and is shown in Table 1. Because the oxygen permeance was below that of the membrane of Comp. Ex. 1 that had been dried at 75° C. for 102 hours, the sample still contained a substantial quantity of solvent.

TABLE 1

|  | Comp. Ex. 1 | | | | | Ex. 2 |
| --- | --- | --- | --- | --- | --- | --- |
| Temperature, ° C. | 75 | 75 | 75 | 75 | 75 | 24 |
| Evaporation time, Hours | 2 | 20 | 42 | 102 | 126 | 168 |
| Oxygen permeance, GPU[1] | 3,830 | 3,967 | 4,025 | 4,050 | 4,039 | 3,220 |

[1]Gas Permeation Unit equal to $7.5005 \times 10^{-16}$ m·s$^{-1}$·Pa$^{-1}$

Comparative Example 3

Measurement of Pressure Normalized Solvent Flux in Liquid Phase Across a Dry Composite Membrane A disc of solvent-free composite membrane excised from the sheet of Comp. Ex. 1 dried for 126 hours was placed in a dead-end filtration cell (HP4750 stirred cell, Sterlitech Corporation, WA, USA). N-hexane (laboratory reagent, Sigma-Aldrich) liquid was fed to the cell at room temperature and 3.1 MPa (450 psi) pressure created by compressed nitrogen forcing the hexane into the cell. Permeated liquid hexane was collected for 1 hour to measure the pressure normalized solvent flux "PNSF" of n-hexane through the membrane. Measured PNSF was 15.4 L/m$^2$-hr-MPa (1.54 L/m$^2$-hr-bar).

Example 4

Preparation of Fluoropolymer Membranes Retaining Residual Solvent

A composite membrane was made by the procedure of Comparative Example 1 except that the precursor composite membrane sheet was dried at ambient temperature and pressure for 24 hours. (Ex. 4a). A disc was excised and tested for PNSF of n-hexane by the procedure described in Comp. Ex. 3. The procedure of Comp. Ex. 1 was repeated to form another composite membrane sheet except that after allowing solvent to evaporate from the precursor composite membrane for a few minutes, the precursor composite membrane was placed in a 75° C. oven for 15 minutes and then PNSF of n-hexane was measured. (Ex. 4b). The procedure of Ex. 3b was repeated except that the time that the drying time of the precursor composite membrane was extended to 18 hours and then PNSF of n-hexane was measured (Ex. 4c). Pressure normalized solvent flux of n-hexane for these samples is presented in Table 2. Because the precursor composite membranes of Exs. 4a, 4b, and 4c were exposed to 75° C. for less time than would accomplish evaporation of all of the solvent applied while forming the selectively permeable membranes, a fraction of the solvent remained in each membrane when measurement of PNSF was performed. Table 2 shows that each of the membranes of Examples 4a, 4b and 4c exhibited higher PNSF of hydrocarbon solvent than that of Comp. Ex. 3. The latter membrane was made with substantially all of residual solvent removed and thus is representative of conventional membranes for selective permeation of liquids.

As drying time increased, greater amounts of solvent evaporated and smaller fractions of solvent remained in the membrane. The data also show that samples with greater fraction of residual solvent had higher PNSF values than more completely solvent-evaporated membranes. Thus it is seen that by utilizing a membrane with a large fraction of residual solvent, a very high PNSF can be attained compared to a conventional, substantially solvent-free membranes. Furthermore, it is possible to "tune" the liquid permeance performance of a membrane, that is, to adjust the membrane to provide a preselected PNSF value intermediate that of a solvent-free membrane and that of a membrane having a large fraction of residual solvent.

TABLE 2

|  |  | Comp. Ex. 3 | Ex. 4a | Ex. 4b | Ex. 4c |
|---|---|---|---|---|---|
| Time at 75° C. | hrs | 102 | 0 | 0.25 | 18 |
| PNSF of n-hexane | L/m$^2$-hr-MPa | 15.4 | 34 | 27.7 | 23 |

Example 5

Improved Permeance Stability of Membranes with Residual Solvent

The procedure of Ex. 4b was repeated to produce a sheet of membrane having a significant fraction of residual solvent. A disc sample was placed in the dead end filtration cell and subjected to permeation of n-hexane for an extended duration in a repeating series of three sequential steps as follows. Firstly, hexane was permeated through the cell for 1 hour at a feed pressure of 3.1 MPa (450 psi) and the permeate during this time was collected to provide a PNSF measurement. Secondly, feed pressure was reduced to 0.34 MPa (50 psi) to lower the consumption of hexane, and permeation continued for 6 hours. Thirdly, hexane was drained from the cell and the membrane was held at room temperature for 17 hours. The three steps were repeated five times with slight variation of the second and third period durations until the total accumulated time of the first and second period durations was 39 hours. That is, the total permeation time was 39 hours. The average of six PNSF measurements was 28 L/m2-hr-MPa (2.8 lit/m2-hr-bar). The extended permeation PNSF value was consistent with the 27.7 L/m2-hr-MPa value obtained in Ex. 4b indicating that the increased permeance achieved by having residual solvent remain in the membrane was a long-lasting effect.

Example 6

Post-Formation Treating a Conventional Membrane with Feed Component

A sheet of composite membrane prepared and dried completely of residual solvent for 75° C. for 102 hours as in Comp. Ex. 1, was immersed in n-hexane for 48 hours at ambient temperature. A disc sample was inserted in a filtration cell to which hexane was fed at 3.1 MPa pressure for 1 hour. Permeate was collected and the normalized solvent flux for hexane was measured as 30 L/m2-hr-MPa. Thus NPSF was about twice the value obtained from the same membrane of Comparative Example 3 that was not post-formation treated with solvent.

Example 7

Improved Permeance Stability of Conventional Membranes Post-Formation Treated with a Feed Component An extended permeation procedure was carried out on the disc sample of Example 6 that had been immersed in hexane for 48 hours. The procedure was similar to the successive series of the three step permeation procedure described in Ex. 5 except that in the third step hexane was kept in the cell in contact with the membrane when the temperature was lowered. The total duration of permeation was 14 hours at which time the PNSF permeance of hexane through the disc sample was measured as 30 L/m$^2$-hr-MPa. This permeance was the same as the value obtained directly after hexane immersion. The results show that the permeance of a conventional, completely dried membrane can be improved by post-formation treating the membrane by contact for an extended time with a component of the feed stream to be permeated. Moreover, the improved permeance is a long-lasting effect.

Example 8

Post-Formation Treating a Membrane Having Residual Solvent with a Feed Component The procedure of Example 6 was repeated except that a composite membrane produced as in Example 4a was post-formation treated by immersing the membrane in hexane for 48 hours. The NPSF after post-formation treatment was 43.8 L/m2-hr-MPa. This demonstrates a significant increase in permeance obtained by combining the features of using a membrane with residual solvent and post-formation treating the membrane by contacting it with a feed component prior to commencing permeation.

Example 9

Separation of N-Hexane from Vegetable Oil

In the vegetable oil manufacturing and processing industry it is common to need to separate n-hexane from mixtures with vegetable oil. For this example a vegetable oil feed solution was produced by mixing 20 parts by weight of consumer grade vegetable oil with 80 parts by weight of laboratory reagent grade n-hexane. The procedure for forming the composite membrane of Ex. 4a was repeated. The membrane was inserted into a dead-end permeation cell and the feed solution was filtered through the membrane. Transmembrane pressure was 3.1 MPa (450 psi). The PNSF for the permeate was measured to be 26.6 L/m$^2$-hr-MPa (2.66 L/m$^2$-hr-bar). Vegetable oil rejection by the membrane was measured to be 99.9% and the permeate was nearly pure n-hexane.

Example 10

Separation of Pentane from Heavy Oil

Separation of light paraffinic solvents such as pentane from mixtures of paraffinic solvent and heavy oil fractions such as in solvent de-asphalting is commonly encountered in the crude oil refining industry. For this example, a feed solution was formed by mixing 6.6 parts by weight of transformer oil (Diala Oil AX, Shell with 93.4 parts by weight of Sigma-Aldrich laboratory reagent grade pentane. The procedure for forming the composite membrane of Ex. 4a was repeated. The membrane was inserted into a dead-end permeation cell and the feed solution was filtered through the membrane. Transmembrane pressure was 3.1 MPa (450 psi). The PNSF for the permeate was measured to be 68 L/m$^2$-hr-MPa (6.8 L/m$^2$-hr-bar). Transformer oil rejection by the membrane was measured to be 99.9% and the permeate was nearly pure pentane.

Example 11

Separation of Hexane from Low Molecular Weight Compounds

Separation of solvents such as hexane from solutions of solvent and low molecular weight compounds is commonly encountered in various chemical processing industries. Examples include isolation of intermediates and active pharmaceutical compounds in pharmaceutical drug manufacturing processes, solvent recovery from various solvent extraction processes, and effluent treatment in various chemical industries. For this example, a feed solution was formed by dissolving 20 mg/L of Oil Blue N (97% Dye content, Sigma-Aldrich) in hexane. Oil Blue N is a dye with molecular weight of 378.51 Daltons. The procedure for forming the composite membrane of Ex. 4a was repeated. The membrane was inserted into a dead-end permeation cell and the feed solution was filtered through the membrane. Transmembrane pressure was 3.1 MPa (450 psi). The PNSF for the permeate was measured to be 33 L/m$^2$-hr-MPa (3.3 L/m$^2$-hr-bar). Dye rejection by the membrane was measured to be 98.4% and the permeate was nearly pure hexane.

Example 12

Liquid Permeation of Various Solvents Through a Membrane Having Residual Solvent The procedure for forming the composite membrane of Ex. 4a was repeated. The membrane was inserted into a dead-end permeation cell and a feed selected from several pure liquid compounds was filtered through the membrane in a series of different trials. The PNSF permeance of the permeating liquid was measured and recorded. Results are shown in Table 3.

TABLE 3

| Liquid Compound | Pressure normalized solvent flux (L/m$^2$-hr-MPa) |
|---|---|
| Pentane | 74 |
| Ethyl Acetate | 10 |
| Dichloromethane | 9 |
| Acetone | 6.2 |
| Tetrahydrofuran | 2.8 |
| Toluene | 2.6 |

Example 13

Permeance of a Lower Oxygen Permeability Polymeric Membrane

A 65 mole % PDD/35 mole % TFE copolymer (Teflon® AF 1600, E. I. du Pont de Nemours & Co.) copolymer has oxygen permeability of 170 barrers compared to 1140 barrer oxygen permeability of Teflon AF 2400. The procedure of Ex. 4a was repeated except that Teflon AF 1600 was substituted for the Teflon AF 2400 copolymer. The PNSF permeance of hexane was measured for the Teflon AF 1600 copolymer membrane to be 2.1 L/m$^2$-hr-MPa. This may be compared to the performance of Ex. 4a. The membranes chemical compositions are seemingly similar in that they differed by the ratio of two comonomers in the membrane polymer. Good PNSF performance typically can be obtained with permeability greater than about 500 barrer.

Comparative Example 14

Determining Permeability of Conventionally Prepared Membrane

A polymer solution was prepared by dissolving 0.3 parts by weight of Teflon AF 2400 copolymer in fluorinated solvent, FC-770. The solution was poured into a flat-bottom open dish at ambient temperature. After 96 hours, enough solvent had evaporated at room temperature to provide a self supporting monolithic membrane. The membrane was then placed in a ventilated oven at 75° C. to remove residual solvent. On a scheduled basis during this drying process, oxygen permeance of the monolithic membrane was measured. Temperature, drying times and permeance measurement data are presented in Table 4. The membrane was considered to be completely free of solvent when the oxygen permeance reached steady value. This occurred after 148 hrs of oven drying when oxygen permeance was determined by measurement to be 79.4 GPU's. Thickness of the dry monolithic membrane was directly measured as 14.37 μm. From measured permeance and the thickness, oxygen permeability of the dry monolithic membrane was calculated to be 1140 barrers ($1.14 \times 10^{-7}$ $cm^3(STP)$-cm/($cm^2$-s-cmHg)). This technique can be used to determine the permeability of a completely dried membrane composition when the permeability is not available from published technical literature. A source for permeability of PDD/TFE copolymers is A. M Polyakov, L. E Starannikova, Yu. P Yampolskii, Amorphous Teflons AF as organophilic pervaporation materials: Transport of individual components, Journal of Membrane Science, Volume 216, Issues 1-2, 1 May 2003, Pages 241-256.

TABLE 4

| Temperature, °C. | 24 | 75 | 75 | 75 | 75 | 75 | 75 |
|---|---|---|---|---|---|---|---|
| Incremental Drying time, hrs | 96 | .25 | 2 | 20 | 48 | 78 | 18 |
| Aggregate Drying time at 75° C., hrs | — | .25 | 2.25 | 22.25 | 70.25 | 148.25 | 166.25 |
| Oxygen Permeance, GPU | 36.4 | 37.2 | 46.8 | 64.6 | 69.7 | 79.4 | 79.1 |

Comparative Example 15

Determining Thickness of a Membrane

The procedure of Comp. Ex. 1 was repeated to produce a completely dry composite membrane. Oxygen permeance of the membrane after complete drying measured as 4050 GPU's. Permeability is a physical property of a substance that is equal to the permeance per unit thickness of the substance. Therefore, from this measured oxygen permeance and the oxygen permeability of the membrane polymer determined in Comp. Ex. 14, the thickness of the membrane was calculated to be 0.28 μm. This technique can be used to determine the effective thickness of an actively permeable layer on an inactively permeable layer of a composite membrane.

The procedure of Example 4b was repeated to produce a polymeric permeable membrane. Oxygen permeance of a sample of the membrane was measured as 3,530 GPU. The membrane was dried completely and the oxygen permeance of the dry membrane sample was measured. Effective thickness of the sample was determined to be 0.28 μm by the procedure of Comp. Ex. 15. From oxygen permeance measured on the membrane as produced (i.e., prior to complete drying), and the effective thickness of the membrane determined on the completely dry membrane, the permeability of the as-produced membrane was calculated to be 988 barrers. This value is substantially lower than the permeability value of 1150 barrers of the completely dry membrane (Comp. Ex. 14). Lower permeability of a sample compared to permeability of a completely dry polymer confirms that the sample contains residual solvent and is effective for operation according to this invention.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. The disclosures of all U.S. patents and patent applications identified herein are hereby incorporated by reference in their entirety.

What is claimed is:

1. A selectively permeable membrane formed by the process comprising the steps of:
   (A) providing a polymeric composition comprising repeating units of a polymerized perfluorinated monomer,
   (B) dissolving the polymeric composition in a liquid medium, thereby forming a membrane casting solution,
   (C) depositing the casting solution onto a support structure to form thereon a membrane precursor that comprises a residual amount of the liquid medium within the membrane precursor,
   (D) optionally draining free-flowing membrane casting solution from the membrane precursor, and
   (E) removing from the membrane precursor a fraction of the residual amount of the liquid medium effective to produce a nonporous selectively permeable membrane which has a pressure normalized solvent flux (PNSF) for N-hexane of at least 23 $Lm^{-2}$-hr-MPa.

2. The selectively permeable membrane of claim 1 in which the nonporous selectively permeable membrane is structurally modified relative to a basic state attained by a conventional nonporous selectively permeable membrane, the conventional nonporous selectively permeable membrane being formed by (i) depositing the casting solution onto the support structure to form thereon a membrane precursor that comprises a residual amount of the liquid medium within the membrane precursor and (ii) rapidly and substantially completely removing from the membrane precursor the residual amount of the liquid medium effective to produce the conventional nonporous selectively permeable membrane.

3. The selectively permeable membrane of claim 1 in which the liquid medium consists essentially of fluorinated solvent for the polymeric composition.

4. The selectively permeable membrane of claim 1 in which the liquid medium present in the nonporous selectively permeable membrane after step (E) is between 0.1% and about 15%.

5. The selectively permeable membrane of claim 1 in which the liquid medium consists essentially of at least one fluorinated chemical compound.

6. The selectively permeable membrane of claim 1 in which the liquid medium comprises about 1-99 wt. % of at least one fluorinated chemical compound and a complementary amount of at least one non-fluorinated chemical compound.

7. The selectively permeable membrane of claim 1 in which the process further includes the step of removing the selectively permeable membrane from the support structure to provide a monolithic membrane.

8. The selectively permeable membrane of claim 1 in which the membrane has an active layer that is selectively permeable to a component of a liquid mixture and in which the process further comprises the step (F) of contacting the active layer with at least one component of the liquid mixture for a duration effective for the component to saturate the selectively permeable membrane.

9. The selectively permeable membrane of claim 8 in which the duration is at least about 1 hour.

10. The selectively permeable membrane of claim 9 in which the contacting step is at about atmospheric pressure.

11. The selectively permeable membrane of claim 1 in which the polymeric composition has oxygen permeability of at least about 500 barrers.

12. The selectively permeable membrane of claim 1 in which liquid medium is contained in the selectively permeable membrane after removing a fraction of the residual amount of the liquid medium.

* * * * *